(12) United States Patent
Raupach

(10) Patent No.: US 12,512,231 B2
(45) Date of Patent: Dec. 30, 2025

(54) ION SURFACE TRAP, AND METHOD FOR OPERATING AN ION SURFACE TRAP

(71) Applicant: BUNDESREPUBLIK DEUTSCHLAND, VERTRETEN DURCH DAS BUNDESMINISTERIUM FÜR WIRTSCHAFT UND ENERGIE, Braunschweig (DE)

(72) Inventor: Sebastian Raupach, Braunschweig (DE)

(73) Assignee: BUNDESREPUBLIK DEUTSCHLAND, VERTRETEN DURCH DAS BUNDESMINISTERIUM FÜR WIRTSCH, Braunschweig (DE)

( * ) Notice: Subject to any disclaimer, the term of this patent is extended or adjusted under 35 U.S.C. 154(b) by 0 days.

(21) Appl. No.: 18/693,290

(22) PCT Filed: Sep. 9, 2022

(86) PCT No.: PCT/EP2022/075085
§ 371 (c)(1),
(2) Date: Mar. 19, 2024

(87) PCT Pub. No.: WO2023/046502
PCT Pub. Date: Mar. 30, 2023

(65) Prior Publication Data
US 2025/0125064 A1 Apr. 17, 2025

(30) Foreign Application Priority Data
Sep. 21, 2021 (DE) ............ 10 2021 124 396.3

(51) Int. Cl.
*G21K 1/00* (2006.01)
*G01J 1/02* (2006.01)
*G01J 1/42* (2006.01)

(52) U.S. Cl.
CPC .............. G21K 1/00 (2013.01); G01J 1/0223 (2013.01); G01J 1/42 (2013.01)

(58) Field of Classification Search
CPC ........ H01J 49/42; H01J 49/422; H01J 49/424; H01J 49/426; G01J 1/42; G01J 1/0223; G21K 1/00
See application file for complete search history.

(56) References Cited

U.S. PATENT DOCUMENTS 5,994,694 A 11/1999 Frank et al.
6,710,334 B1 3/2004 Twerenbold
(Continued)

FOREIGN PATENT DOCUMENTS

CN 112885951 A 6/2021
DE 10 2018 121 942 B3 1/2020
(Continued)

OTHER PUBLICATIONS

Setzer et al: "Fluorescence Detection of a Trapped Ion with a Monolithically Integrated Single-Photon-Counting Avalanche Diode", Sandia National Laboratories, Jul. 8, 2021.
(Continued)

*Primary Examiner* — Kevin K Pyo
(74) *Attorney, Agent, or Firm* — WCF IP

(57) ABSTRACT

The invention relates to an ion surface trap (10) with (a) an electrode pair (12) that comprises a first trap electrode (14.1) and a second trap electrode (14.2) and is configured to form a trap volume for at least one ion (22) when an electrical AC voltage is applied, (b) at least two AC voltage electrodes (16) arranged to close the trap volume and/or generate an
(Continued)

Figure 1A:
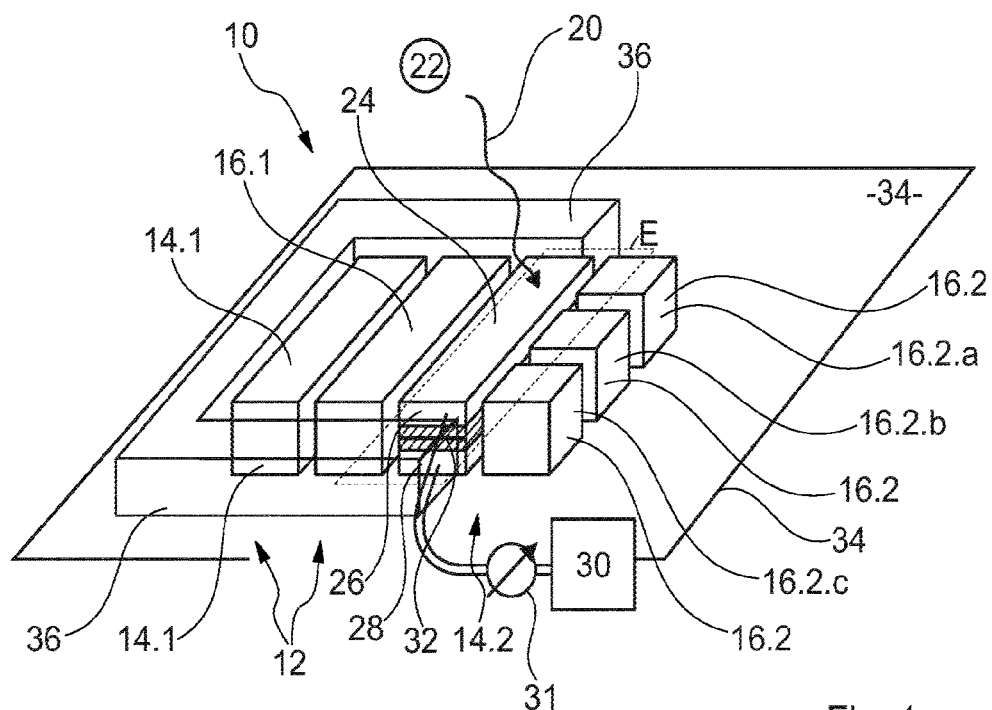

electrical field, by means of which an ion position of an ion (22) trapped in the ion surface trap can be modified relative to the ion surface trap (10), and (c) a sensor for detecting photons (20) emitted by at least one ion (22), wherein (d) the sensor is an energy-sensitive measuring superconductor sensor (18) that has a superconductor layer/separating layer/ superconductor layer structure and (e) at least the first superconductor layer (24, 28) forms the first trap electrode (14).

11 Claims, 2 Drawing Sheets

(56) References Cited

U.S. PATENT DOCUMENTS

2002/0008198 A1* 1/2002 Kasten .................. H01J 49/424
250/397

2019/0057855 A1* 2/2019 Kim ........................ H01J 49/42

FOREIGN PATENT DOCUMENTS

| DE | 10 2019 114 842 A1 | 12/2020 |
|---|---|---|
| JP | 2012-109295 A | 6/2012 |
| WO | 2015/128438 A1 | 9/2015 |

OTHER PUBLICATIONS

Slichter et al: "UV-sensitie superconducting nanowire single photon detectors for integration in an ion trap", Optics Express, vol. 25, No. 8, p. 8705-8720, Apr. 17, 2017.

Todaro et al: "State Readout of a Trapped Ion Qubit Using a Trap-Integrated Superconducting Photon Detector", Physical Review Letters, vol. 126, Jan. 6, 2021.

* cited by examiner

ION SURFACE TRAP, AND METHOD FOR OPERATING AN ION SURFACE TRAP

The invention relates to an ion surface trap with (a) an electrode pair that comprises a first trap electrode and a second trap electrode and that is configured to form a trap volume for at least one ion when an electrical AC voltage is applied, (b) at least two DC voltage electrodes that are arranged to close the trap volume and/or to generate an electrical field, by means of which an ion position of an ion trapped in the ion surface trap can be modified relative to the ion surface trap, and (c) a sensor for detecting photons emitted by at least one ion.

Such ion surface traps are used to hold one, two or multiple (i.e. 3, 4, 5, . . . . N) ions in a given space. For example, an ion surface trap is used in an atomic clock or a quantum computer. An atomic clock and/or a quantum computer with an ion surface trap according to invention are likewise subjects of this invention.

Ion surface traps are often implemented on a chip. Special sensors are arranged on the chip to detect light emitted by the ion, as described, for example, in the article "State Readout of a Trapped Ion Qubit Using a Trap-Integrated Superconducting Photon Detector" by Todaro et al., Phys. Rev. Lett. (2021).

An ion surface trap according to the preamble is known from the article "State Readout of a Trapped Ion Qubit Using a Trap-Integrated Superconducting Photon Detector" by Todaro et al., Physical Review Letters, Vol. 126 2021 No 1, with which qubits can be read out. There are no optical elements between the ion and the detector so that the fluorescence of the ions can be used to measure the quantum efficiency of the detector as well as its dependency on the angle of incidence and incidence polarisation.

The article "Uv-sensitive superconducting nanowire single photon detectors for integration in an ion trap" by Slichter et al, in Optics Express, Vol. 25 2017 No. 8 p. 8705-8720 describes a single-photon detector that is used in a Paul trap with planar radio frequency electrodes.

The paper "Fluorescence detection of a trapped ion with monolithically integrated single-photon-counting avalanche diode" by Setzer et al, in arXiv: 2105.01235v2 [quant-ph], from Jul. 7, 2021 (S 1-6) DOI: 10.48550/arXiv.2105.01235 presents an ion surface trap according to the preamble for detecting fluorescent light of an ion trapped in a trap using single-photon avalanche photodiodes, which are integrated on a chip along with a surface ion trap.

DE 10 2019 114 842 A1 describes an ion trap for holding at least one ion in a space defined by a ponderomotive potential. Electrodes of an electrode structure arranged around the space are controlled in such a way that ions in the ion trap are detected by a laser beam.

DE 10 2018 121 942 B3 discloses an ion trap comprising two electrodes that are configured to generate an electrical field which includes an attractive ponderomotive potential in at least one area. An electrical resonator supplies electrodes of the ion trap with an AC voltage and comprises a resonant circuit arranged within the vacuum chamber. This allows the AC voltage field of the ion trap to be calibrated more easily.

U.S. Pat. No. 6,710,334 B1 describes a quadruple ion trap mass spectrometer for large molecules through the use of cryogenic particle detectors as molecule detectors. Cryogenic particle detectors have a mass-independent detection efficiency and show no reduction in detection efficiency as molecule mass increases when compared with ionizing detectors used in conventional quadrupole ion trap mass spectrometers.

In U.S. Pat. No. 5,994,694 contains an ultra-high mass time-of-flight mass spectrometer that uses a cryogenic particle detector as an ion detector. The cryogenic detector improves performance and sensitivity. A cryogenically cooled Nb—$Al_2O_3$—Nb superconductor-insulator-superconductor (SIS) tunnel junction detector is used that works at 1.3 K. The STJ detector has the capacity to distinguish between charges. Given that the cryogenic STJ detector responds to ion energy and is not reliant on the generation of secondary electrons, it is able to recognize large molecular ions with a speed-independent efficiency of almost 100%.

The article "Quasiparticle trapping and the quasiparticle multiplier" by N. E. Boot, in Applied Physics Letters, Vol. 50 1987 No. 5, p. 293-295, ISSN 0003-6951 (P) describes the detection of phonons, electromagnetic radiation and nuclear particles by means of superconducting tunnel contacts.

WO 2015/128 438 A1 describes a system with a cryostat and a surface electrode trap on a silicon substrate. On its front side are planar electrodes, which are configured in such a way that they generate a capture potential. A first high-frequency electrode extends parallel to the front side of the substrate; a DC electrode extends parallel to the front side, abuts the first high-frequency electrode and is electrically insulated from said high-frequency electrode. The surface electrode trap is arranged in the cryostat, which cools the surface electrode trap to a maximum of 150 K.

It has proven to be very difficult to detect fluorescent radiation emitted by the ion, for example.

The invention aims to improve the detection of photons emitted by the trapped ion.

The invention solves the problem by way of an ion surface trap according to the preamble in which the sensor is an energy-sensitive measuring superconductor sensor that has a superconductor layer/separating layer/superconductor layer structure and in which at least one of the superconductor layers forms at least the first trap electrode and/or DC voltage electrode.

The invention also solves the problem by way of a method for operating such an ion surface trap that comprises the following steps: (i) introducing an ion into the ion surface trap, (ii) applying a DC voltage to the DC voltage electrodes so that the ion remains trapped in the ion surface trap, and (iii) detecting at least one photon emitted by the ion by means of the sensor.

The advantage of the invention is that radiation emitted by the ion only has to travel a short distance to be detected by the sensor and does not have to pass through any optical elements, such as optical windows, lenses, glass fibers etc. The probability of being absorbed on the path from ion to sensor is therefore low.

Due to the spatial proximity of the sensor to the trapped ion, the sensor can also detect photons in a comparatively wide solid angle range. The structure according to the invention also enables the sensor to have a comparatively large spatial expansion, thereby covering an even greater solid angle range than if it were restricted to the space between the electrodes.

It is also convenient that the invention generally allows for a greater integration density. Alternatively or additionally, this results in simplified production, especially in series production.

The invention is based in particular on the idea of eliminating the separation of sensor and trap electrode known from the prior art. In other words, at least one trap electrode forms a part of the structure that serves to detect individual photons.

There is preferably a constant difference in potential between the two superconductor layers. However, the potential of the two superconductor layers preferably oscillates. For example, the potential oscillates with respect to a zero potential of a voltage source, which is designed to apply a common voltage to both superconductor layers, at a trap frequency, said trap frequency being a radio frequency.

If, as intended according to a preferred embodiment of the invention, a DC voltage electrode is used that is composed of at least two partial electrodes, at least one of these partial electrodes can be designed as a sensor.

Within the scope of the present description, a superconductor layer is understood to mean a layer of material which becomes superconductive at a temperature below a critical temperature. Preferably, the superconductor layer is constructed from a high-temperature superconductor. It is beneficial if the high-temperature superconductor has a critical temperature above 77 Kelvin.

The electrode pair is understood to mean the unit composed of the first trap electrode and the second trap electrode. It is possible, but not essential, for at least one of the trap electrodes to be made up of 2, 3 or more partial electrodes. It is also possible, but not essential, for individual partial electrodes to be electrically insulated against each other. Alternatively, the individual partial electrodes are in electrical contact with each other so that they are at the same potential.

When the trap frequency is applied to the electrode pair, a trap volume forms. The trap volume is the space that the ion cannot leave.

DC voltage electrodes are understood to mean electrodes by means of which a static electric confinement field can be generated. The confinement field is preferably configured in such a way that the trap volume is closed in all spatial directions.

It is beneficial if a superconductor layer thickness of the superconductor layer lies between 5 nm and 500 nm.

The separating layer refers to a layer that, for its part, can be composed of multiple partial layers. It is beneficial if the separating layer has a separating layer thickness of between 1 nm and 100 nm.

The sensor is designed in such a way that when a photon strikes the first superconductor layer or the second superconductor layer, Cooper pairs are separated, resulting in free electrons which tunnel through the separating layer and effect a current pulse. Said current pulse can be detected and used to calculate the energy of the photon.

It is beneficial if the ion surface trap is implemented on a chip. In particular, the electrode pair, the DC voltage electrodes and the sensor are integral components of the chip. These structures are produced in particular by successively depositing different layers on top of each other and/or etching out parts of the layered structure.

It is beneficial if the separating layer is an insulator layer arranged between the superconductor layers.

The ion surface trap preferably has a voltage source that is connected to the superconductor layers in such a way that there is a constant difference in potential between the two superconductor layers.

According to a preferred embodiment, the ion surface trap has a tunnelling current change detector for detecting, particularly in a quantitative and/or time-resolved manner, a change in a tunnelling current from the first superconductor layer, through the separating layer and into the second superconductor layer.

Preferably, the insulator layer is arranged in such a way that the tunnelling current change detector detects a change in the tunnelling current when at least one photon strikes one of the superconductor layers or the separating layer.

The tunnelling current change detector is understood to mean a detector with which a change in the tunnelling current can be detected. In particular, a tunnelling current measuring device, by means of which the tunnelling current can be measured, is simultaneously a tunnelling current change detector.

It is beneficial if the separating layer comprises one or multiple small-volume collection layers composed, in addition to the outer superconductive layers of the sensor, of a further superconductive material, the Cooper pair binding energy of which and therefore the energy gap in the single-electron energy diagram around the Fermi level of which is lower than that of the superconductive material found further outwards. As a result, quasiparticles that have transitioned to a slightly lower energy state in the collection layer cannot easily transfer to the outer superconductor with a larger energy gap and flow off there, see N. E. Booth: "Quasiparticle trapping and the quasiparticle multiplier", Appl. Phys. Lett. 50, 293 (1987). The separating layer is therefore preferably constructed in such a way that electrons diffusing into the separating layer and/or quasiparticles accumulate there and cause an increase in the signal of the superconductor sensor by being available several times for tunnelling processes through the separating layer and thus contributing several times to the overall signal.

It is beneficial if the ion surface trap has a substrate on which the first trap electrode and the second trap electrode, the first superconductor layer, the second superconductor layer and the separating layer are mounted. It should be noted that this does not necessarily mean that the corresponding structure, for example the first trap electrode, is mounted directly on the substrate. Rather, it is also possible that one of the named structures is mounted on another of the named structures, which for its part is indirectly or directly connected to the substrate. The only decisive factor is that the first trap electrode, the second trap electrode, the first superconductor layer, the second superconductor layer and the separating layer preferably form an integral unit with the substrate.

The substrate may refer, for example, to a semi-conductor, quartz glass or corundum. Other substrate materials are possible.

It is advantageous if the second superconductor layer is electrically insulated and potential-separated from the first superconductor layer. The feature that the two superconductor layers are potential-separated means in particular that they are insulated from each other and not in contact with each other. It is therefore possible that the two superconductor layers are at different electrical potentials. This is different in the case of nano wires, for example, which must be entirely one potential relative to a counter-element, the counter-element being at the same potential as one of the trap electrodes.

The voltage source is preferably configured and contacted to apply a common voltage to both superconductor layers. The common voltage is preferably an AC voltage if at least one of the trap electrodes is designed as a photon detector. The common voltage is preferably a DC voltage if at least one of the DC voltage electrodes is designed as a photon detector.

Preferably, the voltage source is configured and connected to the superconductor layers in such a way that a difference in potential between the two superconductor layers is constant in terms of time. In particular, this means that a difference in potential is so small that the fluctuation has an uncertainty contribution of at most 50% in relation to the overall uncertainty of the measurement of the change in tunnelling current. Preferably, the difference in potential fluctuates by at most one percent per second.

If, as intended according to a preferred embodiment, the voltage source is an AC voltage source, it preferably has a high-pass filter to which one or multiple DC voltage sources with the same frequency are connected.

The ion surface trap preferably has a magnetic field generator that generates a magnetic field in a separating layer plane of the separating layer. In particular, this allows a background tunnelling current to be suppressed.

If several ions are to be caught in the ion surface trap, which represents a preferred embodiment, it is advantageous if it is possible to determine, with at least sufficiently high probability, which ion a photon detected by the superconductor sensor originates from. It is therefore beneficial if at least one of the superconductor layers comprises at least two spatially separate detection sections that are electrically insulated against each other.

It is beneficial if the detection sections are connected to the tunnelling current change detector in such a way that the strike point of the photon can be determined. The feature that the strike point of the photon can be determined is understood particularly to mean that the ion from which a detected photon originates can be determined with a certainty of at least 75%, particularly at least 85%, for example at least 90%.

Preferably, the ion surface trap has an evaporator for generating a gas composed of particles of a chemically pure substance, such as a metal, especially an alkaline metal, and a photon-ionizer for ionizing metal atoms, especially alkaline metal atoms, so that ions are created. The photon-ionizer preferably has an electrode arrangement and a control unit that is connected to the electrode arrangement such that the generated ions can be introduced individually into the ion surface trap.

It is beneficial if the ion surface trap comprises an evaluation unit that is connected to the tunnelling current change detector. The evaluation unit is preferably configured to perform a method according to the invention.

Within the scope of the method according to the invention, the step of introducing an ion into the ion surface trap preferably includes the steps (i) vaporizing a pure substance, such as a metal, in particular an alkaline metal, so that a vapor is produced, (ii) photon-ionizing the vapor, particularly metal atoms of the metal vapor, and (iii) moving at least one ion of the vapor into a trap volume of the ion surface trap.

Figure 1B:
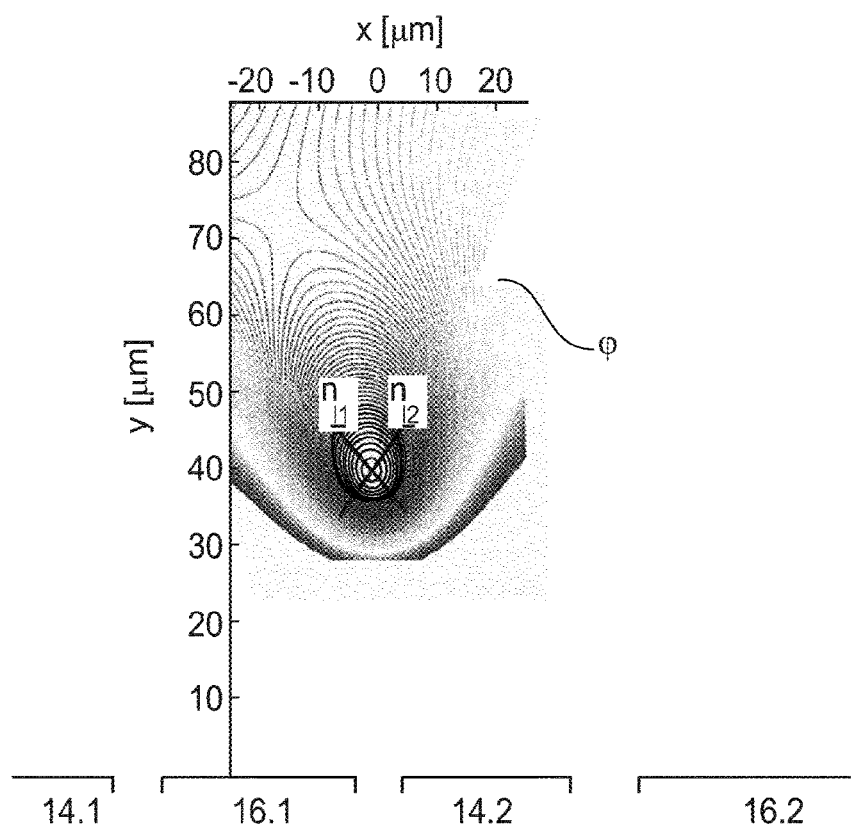

In the following, the invention will be explained in more detail with the aid of the accompanying drawings. They show:

FIG. 1 in partial FIG. 1a, a schematic, perspective view of an ion surface trap according to the invention and in FIG. 1b, a cross-section through the electrical potential that occurs when the electrical alternating field is applied to the electrode pair. The two crosses indicate the direction of the axes of the normal modes $n^\perp_1$ and $n^\perp_2$.

Figure 2A:
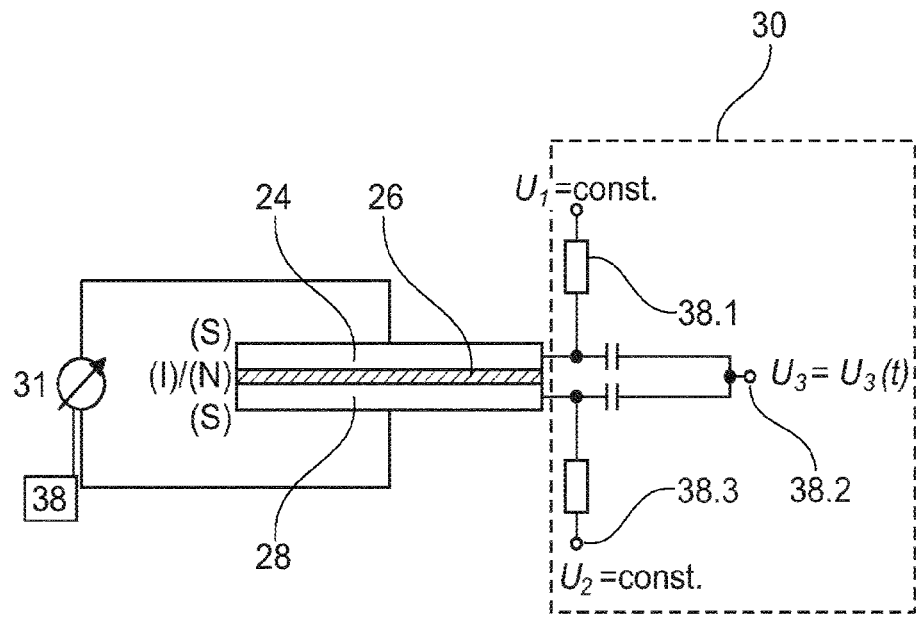
Figure 2B:
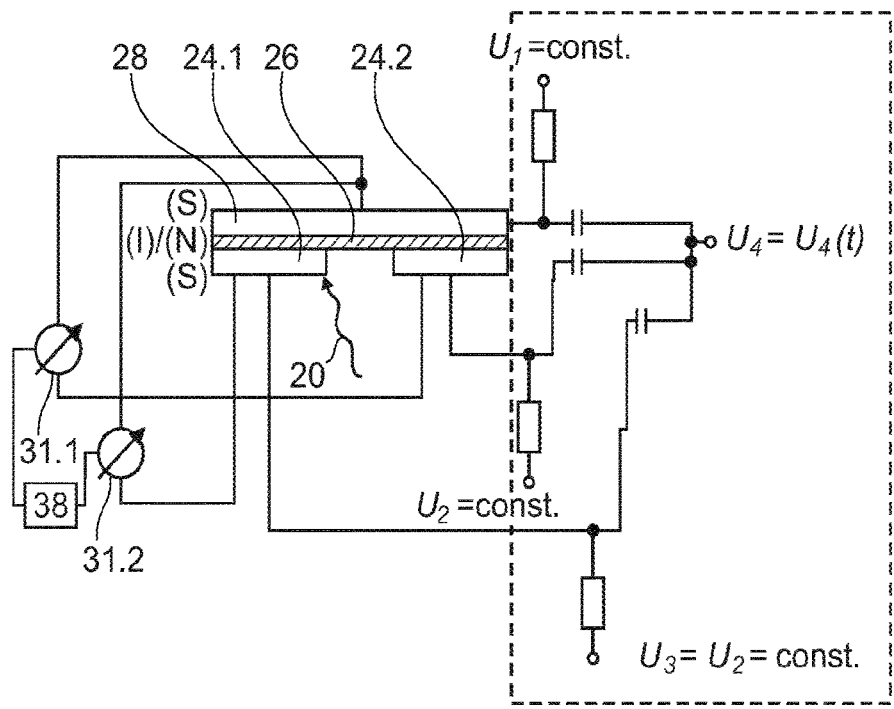

FIG. 2 depicts, in partial FIG. 2a, a diagram of the voltage source that is connected to the two superconductor layers according to a first embodiment, and in partial FIG. 2b, a diagram of the voltage source connected to the two superconductor layers according to a second embodiment.

FIG. 1a depicts an ion surface trap 10 with an electrode pair 12, which comprises a first trap electrode 14.1 and a second trap electrode 14.2. The ion surface trap 10 also has two DC voltage electrodes 16.1, 16.2.

A superconductor sensor 18 can be used to detect a schematically depicted photon 20, which has been emitted by a likewise schematically depicted ion 22. The DC voltage electrodes 16.1, 16.2 are connected to a positioning voltage source, not depicted here, which is configured to emit a voltage so that the ion 22 is positioned in a given position $P_{22}$.

The superconductor sensor 18 has a first superconductor layer 24, a separating layer 26 and a second superconductor layer 28. The first superconductor layer is made, for example, of niobium or tantalum or a high-temperature superconductor such as yttrium barium copper oxide. The separating layer 26 is preferably composed of an insulator, such as a aluminium oxide, and can comprise a collection layer, for example made of aluminium. The second superconductor layer is preferably composed of the same material as the first superconductor layer.

FIG. 1a also shows a voltage source 30, which is connected to the superconductor layers 24, 26. The voltage source 30 subjects the first superconductor layer 24 to a first DC voltage $U_{W,24}$, which has a trap frequency $f_t$, and the second superconductor layer 26 to a second DC voltage $U_{w,26}$, which also has the Trap Frequency $f_t$. A difference in potential $\Delta U=|\mu_{W,24}-U_{W,26}|$ is constant and smaller than the energy band gap of the superconductor used divided by the elementary charge. In the case of niobium, for example, this results in a suitable voltage of approximately 1 mV.

A tunnelling current $I_{26}$ flows between the two superconductor layers 24, 26 and thus through the separating layer 26, said current being detected by a tunnelling current change detector 31.

It is schematically shown that the separating layer 26 may comprise a collection layer 32, which in the present case is made of aluminium. The collection layer 32 is not contacted separately, but comprises a contact surface to the insulator and to the respective superconductor layer.

The trap electrodes 14.1, 14.2 and the DC voltage electrodes 16.1, 16.2 are arranged on a substrate 34 and are produced, for example, by successive layer build-up and subsequent etching.

FIG. 1a also schematically depicts a magnetic field generator 36 in the form of a magnet that generates a magnetic field in and parallel to a separating layer plane E. The separating layer 26 extends along the separating layer plane E. The magnetic field acts to suppress the amplitude of intrinsic background currents, such as those of the Josephson DC current and geometry-dependent resonance effects of the Josephson DC current, which lead to voltage-dependent peaks in the DC current in the current-voltage characteristic (so-called "Fiske steps").

FIG. 1b shows a cross-section through the electrical potential φ that occurs when the electrical alternating field is applied to the electrode pair 12. The cross illustrates the expected position of the ion.

FIG. 1a shows that the DC current electrode 16.2 may be composed of two, three or more partial electrodes, in the present case three partial electrodes 16.2.a, 16.2.b and 16.2.c.

FIG. 2a depicts the circuit of the voltage source 30, which comprises three partial current sources 38.1, 38.2, 38.3. The partial voltage sources 38.1, 38.3 each emit constant voltages $U_1$, $U_2$. The partial voltage source 38.2 emits a pure alternating voltage $U_3=U_W$ with the trap frequency $f_t$. Each voltage refers to the potential of the substrate 34.

FIG. 2b depicts the circuit when the second superconductor layer 24 is constructed on n (here: n=2) partial electrodes 24.1, 24.2. In this case, there are n tunnelling current change detectors 31.1, 31.2, each of which is in contact with one of the partial electrodes 24.1, 24.2. Each partial electrode is a detection section.

The voltage source 30 has n partial voltage sources for emitting an equal DC voltage $U_1=U_2=U_g$ and a partial voltage source for emitting the AC voltage $U_4=U_W$ with the trap frequency $f_t$ of the DC voltage.

If the schematically depicted photon 20 strikes the first partial electrode 14.1, for example, it effects a change in the tunnelling current $I_{26}$ from the first partial current 14.1 to the second superconductor layer 28. The tunnelling current change detector 31 preferably has n partial tunnelling current change detectors, in this case the partial tunnelling current change detectors 31.1, 31.2. The change in tunnelling current from the first partial electrode 14.1 to the second superconductor layer 28 is detected by the first partial tunnel current change detector 31.1.

The change in tunnelling current is detected by a schematically depicted evaluation unit 38 connected to the tunnelling current change detector 31, the former calculating the energy of the photon 20 from the tunnelling current $I_{26}$ and registering the time of detection.

REFERENCE NUMERALS 10 ion surface trap
12 electrode pair
14.1, 14.2 trap electrode
16.1, 16.2 DC voltage electrode
18 superconductor sensor
20 photon
22 ion
24 first superconductor layer
24.1, 24.2 partial electrodes
26 separating layer
28 second superconductor layer
30 voltage source
31 tunnelling current change detector
31.1, 31.2 partial tunnelling current change detector
32 collection layer
34 substrate
36 magnetic field generator
38 evaluation unit
38.1, 38.2, 38.3 partial voltage source
ΔU difference in potential
$f_t$ trap frequency
E separating layer plane
$U_g$ DC voltage
$U_{AC}$ AC voltage

The invention claimed is:

1. An ion surface trap, comprising:
   (a) an electrode pair that comprises
      a first trap electrode,
      a second trap electrode, and
      wherein the electrode pair is configured to form a trap volume for at least one ion when an electrical AC voltage is applied,
   (b) at least two DC voltage electrodes arranged to close the trap volume and/or generate an electrical field, wherein when the trap volume is closed and/or the electrical field is generated an ion position of an ion trapped in the ion surface trap is modifiable relative to the ion surface trap, and
   (c) a sensor for detecting photons emitted by the at least one ion, wherein
   (d) the sensor is an energy-sensitive measuring superconductor sensor which has a first superconductor layer/separating layer/second superconductor layer structure, and
   (e) at least the first super conductor layer or at least the second super conductor layer in the first superconductor layer/separating layer/second superconductor layer structure forms the first trap electrode.

2. The ion surface trap according to claim 1, wherein
   (a) the separating layer is an insulator layer arranged between the first super conductor layer and the second super conductor layer layers,
   (b) a voltage source is connected to the first super conductor layer and the second superconductor layer such that a constant difference in potential between the first super conductor layer and the second superconductor layer is produced,
   (c) the ion surface trap further comprises a tunnelling current change detector for detecting a change in a tunnelling current through the separating layer, and
   (d) the separating layer is arranged such that the tunnelling current change detector detects a change in tunnelling current when a photon strikes one of the first superconductor layer, the second superconductor layer, or the separating layer.

3. The ion surface trap according to claim 2, wherein
   (a) the separating layer comprises one or multiple normal conducting collection layers, and
   (b) the separating layer is constructed such that electrons diffusing into the separating layer accumulate in or at the separating layer and cause an increase in a signal of the superconductor sensor.

4. The ion surface trap according to claim 1 further comprising
   (a) a substrate on which the first trap electrode, the second trap electrode, the first superconductor layer, the second superconductor layer, and the separating layer are mounted,
   (b) wherein the second superconductor layer is electrically insulated and potential-separated from the first superconductor layer, and
   (c) the second trap electrode is insulated and potential-separated from the first trap electrode.

5. The ion surface trap according to claim 2 wherein
   the voltage source is configured to apply a common AC voltage to both the first superconductor layer and the second superconductor layer.

6. The ion surface trap according to claim 1 further comprising a magnetic field generator which generates a magnetic field in a separating layer plane of the separating layer which suppresses background tunnelling current.

7. The ion surface trap according to claim 2 wherein
   (a) at least one of the first superconductor layer and the second superconductor layer comprises at least two detection sections that are spatially separated from and electrically insulated against each other, and
   (b) wherein the at least two detection sections are connected to the tunnelling current change detector such that a strike point of the photon can be determined.

8. The ion surface trap according to claim 1 wherein the first superconductor layer/separating layer/second superconductor layer structure comprises a first superconductor layer, a separating layer, and a second superconductor layer.

9. A method for operating an ion surface trap according to claim 1, comprising:

(i) introducing an ion into the ion surface trap,
(ii) applying a DC voltage to the DC voltage electrodes so that the ion remains trapped in the ion surface trap, and
(iii) detecting at least one photon emitted by the ion using the superconductor sensor.

10. The method for operating an ion surface trap according to claim 9, wherein the step of introducing an ion into the ion surface trap comprises:
 (i) vaporizing a pure substance, thereby producing a vapor,
 (ii) photon-ionizing the vapor, and
 (iii) moving at least one ion of the vapor into a trap volume of the ion surface trap.

11. An ion surface trap, comprising
an electrode pair that comprises
 a first trap electrode,
 a second trap electrode, and
 wherein the electrode pair is configured to form a trap volume for at least one ion when an electrical AC voltage is applied,
at least two DC voltage electrodes arranged to close the trap volume and/or generate an electrical field, wherein when the trap volume is closed and/or the electrical field is generated an ion position of an ion trapped in the ion surface trap is modifiable relative to the ion surface trap,
a sensor for detecting photons emitted by the at least one ion, wherein
 the sensor is an energy-sensitive measuring superconductor sensor which has a first superconductor layer/separating layer/second superconductor layer structure, and
 at least the first super conductor layer or at least the second super conductor layer forms the first trap electrode, and
an evaluation unit configured to automatically carry out a method according to claim 9.

* * * * *